US011431931B2

(12) United States Patent
Bohannon

(10) Patent No.: US 11,431,931 B2
(45) Date of Patent: Aug. 30, 2022

(54) CTIA PIXEL WITH SHARED RESET NETWORK

(71) Applicant: Sony Semiconductor Solutions Corporation, Kanagawa (JP)

(72) Inventor: Eric Bohannon, Henrietta, NY (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/149,045

(22) Filed: Jan. 14, 2021

(65) Prior Publication Data

US 2022/0224854 A1 Jul. 14, 2022

(51) Int. Cl.
*H04N 5/3745* (2011.01)
*H04N 5/378* (2011.01)

(52) U.S. Cl.
CPC ........... *H04N 5/3745* (2013.01); *H04N 5/378* (2013.01)

(58) Field of Classification Search
CPC .............................. H04N 5/3745; H04N 5/378
See application file for complete search history.

(56) References Cited

U.S. PATENT DOCUMENTS

| 6,459,078 B1* | 10/2002 | Fowler | H04N 5/361 |
| | | | 250/208.1 |
| 2014/0346321 A1* | 11/2014 | Kinugasa | H04N 5/378 |
| | | | 250/208.1 |
| 2021/0344858 A1* | 11/2021 | Heim | H04N 5/37455 |

OTHER PUBLICATIONS

International Search Report and Written Opinion dated Oct. 18, 2021 for corresponding International Application No. PCT/US2021/051530.

* cited by examiner

*Primary Examiner* — Nicholas G Giles
(74) *Attorney, Agent, or Firm* — Michael Best & Friedrich LLP

(57) ABSTRACT

An image sensor and pixel circuit therefor includes a plurality of pixels arranged in an array, a first pixel of the plurality of pixels including: a first photoelectric conversion device; a first amplifier including a first input terminal connected to the first photoelectric conversion device, and a first output terminal; a first capacitor disposed between the first input terminal and the first output terminal; and a first reset switch network disposed between the first input terminal and the first output terminal in parallel with the first capacitor, the first reset switch network including a first reset transistor with a first body terminal connected to a common reference voltage, a second reset transistor, and a third reset transistor.

19 Claims, 4 Drawing Sheets

CTIA PIXEL WITH SHARED RESET NETWORK

BACKGROUND OF THE INVENTION

1. Field of the Invention

This application relates generally to image sensors. More specifically, this application relates to a system and method for implementing a capacitive transimpedance amplifier (CTIA) pixel circuit architecture in high conversion gain and small-pixel applications.

2. Description of Related Art

Image sensing devices typically consist of an image sensor, generally implemented as an array of pixel circuits, as well as signal processing circuitry and any associated control or timing circuitry. Within the image sensor itself, charge is collected in a photoelectric conversion device of the pixel circuit as a result of the impingement of light.

Some existing pixel circuits implement a complementary metal-oxide-semiconductor (CMOS) architecture, in which the transfer of the charge within the pixel circuit and/or to downstream circuitry (e.g., signal processing circuitry) is controlled using one or more metal-oxide-semiconductor field-effect transistors (MOSFETs). A CTIA pixel circuit is one example of a pixel circuit which implements the CMOS architecture.

Some comparative CTIA pixel circuits may exhibit leakage current. Therefore, there exists a need for a CTIA pixel circuit that minimizes potential leakage currents to achieve a linear zero-biased high conversion gain and to minimize area when using a matrix of such pixel circuits together.

BRIEF SUMMARY OF THE INVENTION

Various aspects of the present disclosure relate to an image sensor, readout circuit therefor, and calibration method thereof.

In one aspect of the present disclosure, there is provided a pixel circuit comprising: a photoelectric conversion device; an amplifier including a first input terminal connected to the photoelectric conversion device, and an output terminal; a capacitor disposed between the first input terminal and the output terminal; and a reset switch disposed between the first input terminal and the output terminal in parallel with the capacitor, the reset switch including a body terminal connected to a common reference voltage.

In another aspect of the present disclosure, there is provided a pixel circuit comprising: a plurality of pixels arranged in an array, a first pixel of the plurality of pixels including: a first photoelectric conversion device; a first amplifier including a first input terminal connected to the first photoelectric conversion device, and a first output terminal; a first capacitor disposed between the first input terminal and the first output terminal; and a first reset switch network disposed between the first input terminal and the first output terminal in parallel with the first capacitor, the first reset switch network including a first reset transistor with a first body terminal connected to a common reference voltage, a second reset transistor, and a third reset transistor.

In this manner, the above aspects of the present disclosure provide for improvements in at least the technical field of imaging, as well as the related technical fields of signal processing, image processing, and the like.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed systems and methods can be used in any device in which there is a need to reduce noise in a signal processing or other analog circuit; for example, an audio signal processing circuit, industrial measurement and systems, and the like. Furthermore, the image sensor implementations described below may be incorporated into an electronic apparatus, including but not limited to a smartphone, a tablet computer, a laptop computer, and the like.

Image Sensor

Figure 1:
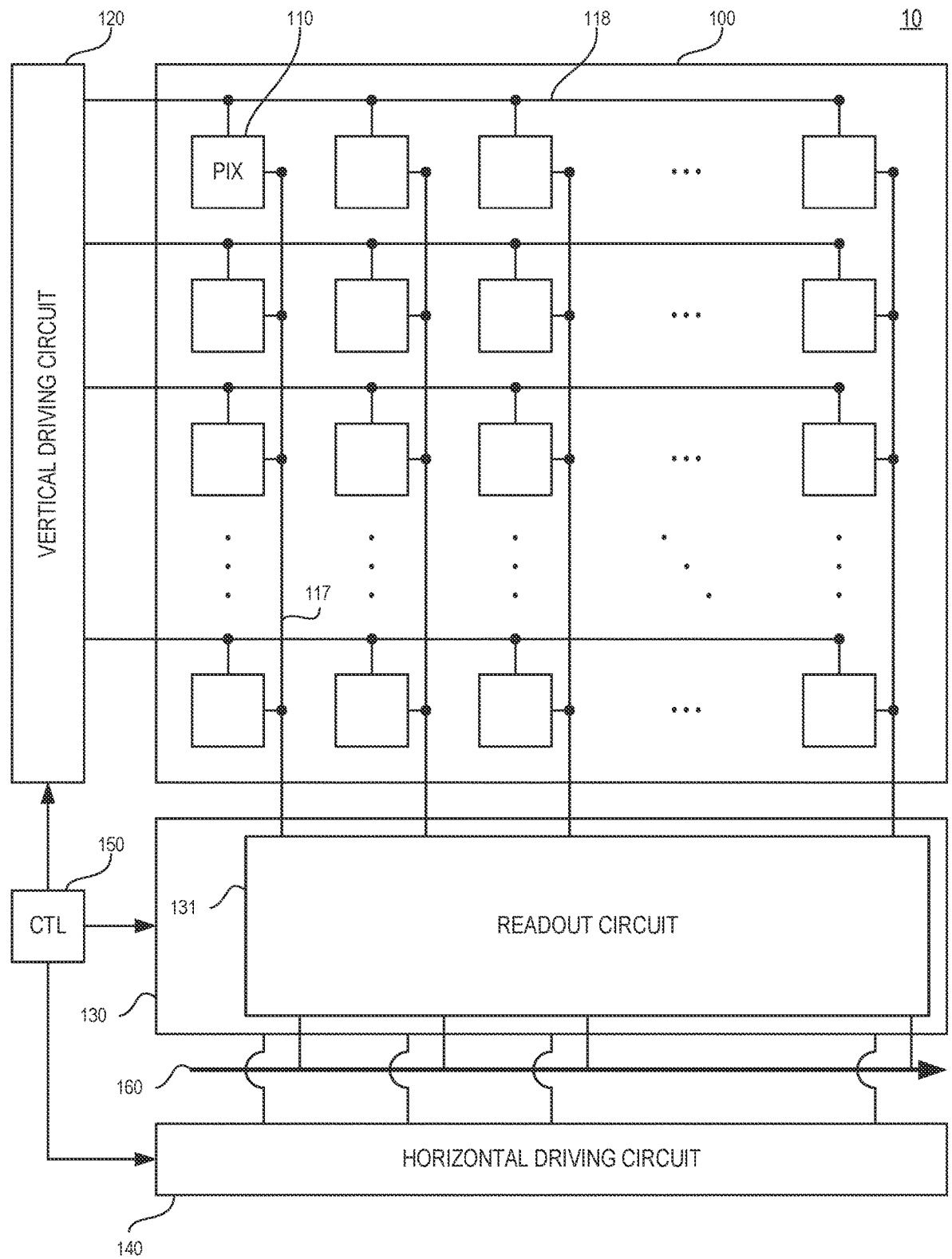
FIG. 1 illustrates an exemplary image sensor according to various aspects of the present disclosure.

FIG. 1 illustrates an image sensor 10 according to various aspects of the present disclosure. Image sensor 10 includes an array 100 of pixel circuits 110. The pixel circuits 110 are located at intersections where horizontal signal lines 118 and vertical signal lines 117 cross one another. The horizontal signal lines 118 are operatively connected to a vertical driving circuit 120, also known as a "row scanning circuit," at a point outside of the pixel array 100, and carry signals from the vertical driving circuit 120 to a particular row of the pixel circuits 110. Pixels in a particular column output an analog signal corresponding to an amount of incident light to the vertical signal line 117. For illustration purposes, only a subset of the pixel circuits 110 are actually shown in FIG. 1; however, in practice the image sensor 10 may have up to tens of millions of pixel circuits ("megapixels" or MP) or more.

The vertical signal line 117 conducts the analog signal for a particular column to a column circuit 130, also known as a "signal processing circuit." While FIG. 1 illustrates one vertical signal line 117 for each column in the pixel array 100, the present disclosure is not so limited. For example, more than one vertical signal line 117 may be provided for each column, or each vertical signal line 117 may correspond to more than one column. In any case, the column circuit 130 preferably includes a readout circuit 131, which may include a plurality of individual sub-circuits and is also known collectively as "readout and ADC circuits". The column circuit 130 including the readout circuit 131 may include various components such as one or more analog amplifiers, ADCs, S/H circuits, and the like. The various components of the column circuit 130 may communicate with one another via a bus line 160. The column circuit 130 is configured to perform one or more signal processing operations on a signal received via the vertical signal line 117, including but not limited to an amplifying operation, an analog-to-digital conversion operation, a sampling operation, a correlated double sampling (CDS) operation, a pixel binning operation, a pixel thinning operation, an output operation, and the like.

The column circuit 130 is operatively connected to a horizontal driving circuit 140, also known as a "column scanning circuit." A controller 150 is in electric communication with the vertical driving circuit 120, the horizontal driving circuit 140, and the column circuit 130. Signals from the controller 150 may be transmitted to a specific pixel circuit 110 within the array 100 by selecting a particular row via a horizontal signal line 118 and a particular column via a vertical signal line 117.

CTIA Pixel Circuits

Figure 2:
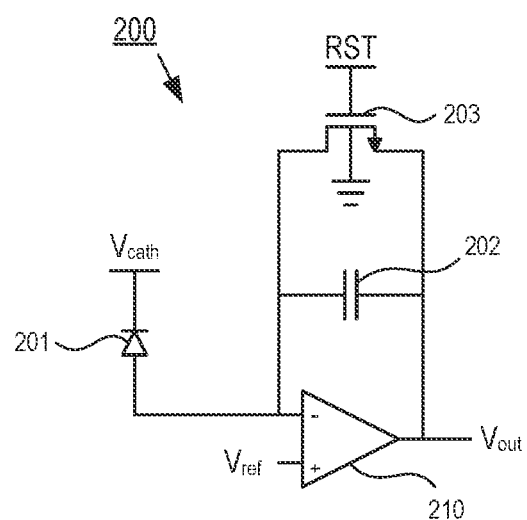
FIG. 2 illustrates an exemplary pixel circuit according to a comparative example.

FIG. 2 illustrates an exemplary pixel circuit 200 in accordance with the present disclosure, which implements a CTIA architecture. Specifically, FIG. 2 illustrates the pixel circuit 200 as a differential amplifier implementation. The pixel circuit 200 is one example of the pixel circuit 110 illustrated in FIG. 1.

The pixel circuit 200 includes a photoelectric conversion device 201 (e.g., a photodiode), a feedback capacitor 202, a reset transistor 203, and a differential amplifier 210. In this particular implementation, the reset transistor 203 is connected in parallel with the electrodes of the feedback capacitor 202, and a body terminal of the reset transistor 203 is grounded. In other aspects not illustrated, the body terminal of the reset transistor 203 may be connected to a source terminal of the reset transistor 203, thereby creating a source-body tie, or the body terminal of the reset transistor 203 may be connected to a common voltage $V_{ref}$, thereby creating a shared-body connection between a plurality of reset transistors 203 implemented in the array 100 of pixel circuits 110. The pixel circuit 200 integrates a charge on the photoelectric conversion device 201, and outputs a signal $V_{out}$ indicative of the charge. An inverting terminal of the differential amplifier 210 is operatively connected to an anode electrode of the photoelectric conversion device 201, and a non-inverting terminal of the differential amplifier 210 receives a reference voltage $V_{ref}$. The signal $V_{out}$ may be output to the appropriate vertical signal line 117 illustrated in FIG. 1. While not illustrated in the particular example of FIG. 2, the pixel circuit 200 may include one or more additional transistors, such as a selection transistor between the output of the pixel circuit 200 and the vertical signal line 117, a source-follower transistor, and so on. Moreover, while FIG. 2 illustrate n-type MOS (NMOS) transistors, the pixel circuit 200 may be implemented using p-type MOS (PMOS) transistors or using a combination of NMOS and PMOS transistors.

The reset switch discussed above is implemented as the signal reset transistor 203 in FIG. 2. A gate terminal of the reset transistor 203 receives a reset signal RST. In some aspects, the reset signal RST is a reset voltage $V_{reset}$ that, when applied to the gate of the reset transistor 203, turns on the reset transistor 203 to conduct current flow. Depending on the value of the control signal RST at a given time, the reset transistor 203 is either in an open state such that no current is conducted or a closed state such that current flow is conducted. In practice, however, the reset transistor 203 conducts leakage current from a source terminal thereof to a drain terminal thereof, even when the control signal RST is such that the reset transistor 203 is in the open state. This source-to-drain leakage current may be integrated onto the feedback capacitor 202 and consume dynamic range, potentially resulting in INL degradation due to a nonlinear function of voltage across the reset transistor 203. In addition, the leakage current, when integrated onto the feedback capacitor 202, may flow through the feedback capacitor 202 and into the drain-to-body junction on the reset transistor 203. This drain-to-body current flow exists because the junction may not be zero-biased.

A CTIA pixel circuit may implement a capacitor and a reset switch which resets the pixel circuit (e.g., by reinitializing the charge on the capacitor) between integrations. An ideal reset switch would present infinite impedance when open, and thus would not conduct any current. However, practical circuit components may conduct leakage current even when the switch is open. This leakage current may be problematic in operating the pixel circuit. In particular, the leakage current may be integrated onto the capacitor and consume dynamic range and/or result in integral non-linearity (INL) degradation.

These effects may lead to low gain in the pixel circuit. Thus, it may be difficult to build a high conversion-gain CTIA pixel circuit. For example, a larger conversion gain may be realized by using a capacitor having a relatively small capacitance. However, if the capacitance is too small, the effects of the leakage current may become large. These problems may also be exacerbated as integration time increases.

To address the effects of leakage current through the reset switch, an implementation using a reset switch network will be described in more detail below.

Reset Switch Network

Figure 3:
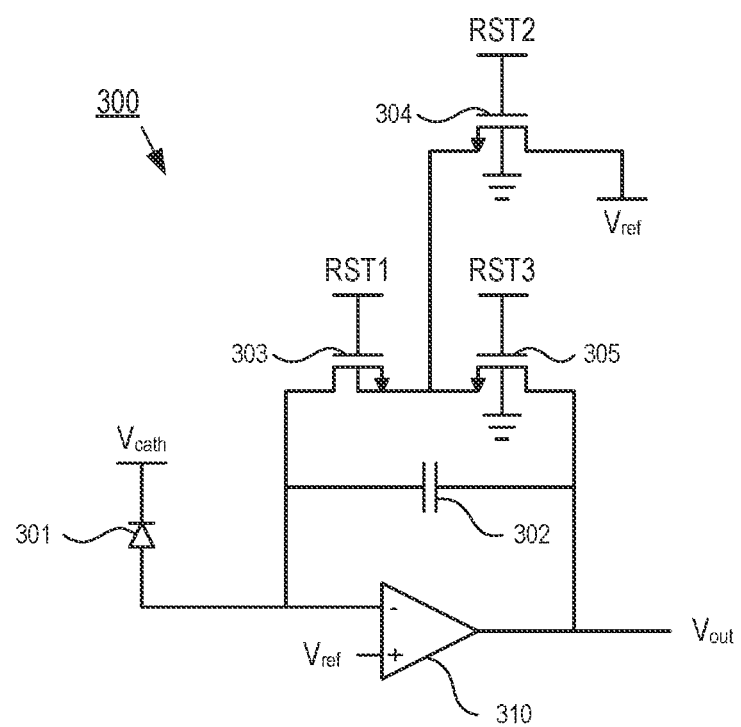
FIG. 3 illustrates an exemplary pixel circuit according to various aspects of the present disclosure.

FIG. 3 illustrates an exemplary pixel circuit 300 having a CTIA architecture and which implements a reset switch network. The pixel circuit 300 is one example of the pixel circuit 110 illustrated in FIG. 1.

Compared with the pixel circuit 200 illustrated in FIG. 2, the pixel circuit 300 replaces the single reset transistor 203 with a three-transistor reset switch network. In particular, the pixel circuit 300 includes a photoelectric conversion device 301 (e.g., a photodiode), a feedback capacitor 302, a first reset transistor 303, a second reset transistor 304, a third reset transistor 305, and a differential amplifier 310. The pixel circuit 300 integrates a charge on the photoelectric conversion device 301 and outputs a signal $V_{out}$ indicative of the charge. An inverting terminal of the differential amplifier 310 is operatively connected to an anode electrode of the photoelectric conversion device 301, and a non-inverting terminal of the differential amplifier 310 receives a reference voltage $V_{ref}$. The signal $V_{out}$ may be output to the appropriate vertical signal line 117 illustrated in FIG. 1. While not illustrated in the particular example of FIG. 3, the pixel circuit 300 may include one or more additional transistors, such as a selection transistor between the output of the pixel circuit 300 and the vertical signal line 117, a source-follower transistor, and so on. Moreover, while FIG. 3 illustrates NMOS transistors, the pixel circuit 300 may be implemented using PMOS transistors or using a combination of NMOS and PMOS transistors.

In the reset switch network, a body terminal of the first reset transistor 303 is connected to a source terminal of the first reset transistor 303, thereby creating a source-body tie. This source-body tie in the first reset transistor 303 creates a unique well voltage in each pixel circuit 110 that implements the reset switch network and thus consumes a larger pixel area. The respective body terminals of the second reset transistor 304 and the third reset transistor 305 are grounded. The first reset transistor 303 and the third reset transistor 305 are connected in series across the electrodes of the feedback capacitor 302, such that the source terminal of the first reset transistor 303 is connected to a source terminal of the third reset transistor 305. In some implementations, the source terminal of the first reset transistor 303 may instead be connected to a drain terminal of the third reset transistor 305, or a drain terminal of the first reset transistor 303 may instead be connected to the source terminal of the third reset transistor 305. A source terminal of the second reset transistor 304 is connected to a node between the first reset transistor 303 and the third reset transistor 305. A drain terminal of the second reset transistor 304 is connected to the reference voltage $V_{ref}$. Each of the transistors in the reset switch network operates under the control of a corresponding control signal, such that a gate terminal of the first reset transistor 303 receives a first reset signal RST1, a gate terminal of the second reset transistor 304 receives a second reset signal RST2, and a gate terminal of the third reset transistor 305 receives a third reset signal RST3.

In operation, the pixel circuit 300 has two main operating states: a reset state and an integration state. During the integration state of the pixel circuit 300, the reset signals RST1-RST3 have respective values such that the first reset transistor 303 is in the open state, the second reset transistor 304 is in the closed state, and the third reset transistor 305 is in the open state. In this state, the leakage current is minimized because, ignoring the offset voltage of the differential amplifier 310, the respective voltages on all terminals of the first reset transistor 303 are equal. Because the first reset transistor 303 is source-body tied, the junction component of the leakage current is minimized. This may result in an increased conversion pixel circuit of up to 60 µV/e⁻. While FIG. 3 illustrates the body terminals of the second reset transistor 304 and the third reset transistor 305 being connected to ground, in practical implementations one or both of these transistors may be source-body tied.

During the reset state of the pixel circuit 300, the reset signals RST1-RST3 have respective values such that the first reset transistor 303 is in the closed state, the second reset transistor 304 is in the open state, and the third reset transistor 305 is in the closed state. This effectively places the circuit in a unity-gain mode, such that the reference voltage $V_{ref}$ is passed to the output (ignoring offset voltage). In order to account for systematic offset in the differential amplifier 310, it may instead be possible to pass a voltage other than the reference voltage $V_{ref}$ in this state. Moreover, in some implementations, when transitioning from the reset state to the integration state, the first reset transistor 303 may be opened before the second reset transistor 304 closes and the third reset transistor 305 opens. This timing may minimize charge injection.

A larger conversion gain (e.g., greater than 50 µV/e⁻) may be realized by implementing the network of reset switches to replace the single reset switch. Increasing the number of reset switches in the CTIA pixel circuit may, under certain circuit designs, minimize the leakage current. However, although the junction component of the leakage current is minimized in the pixel circuit 300, the reset switch network of pixel circuit 300 still creates a unique well voltage. When a plurality of the pixel circuits 300 are combined to create the array 100 of pixel circuits 110 as shown in FIG. 1, the unique well voltage of each pixel circuit 300 consumes dynamic range, thus making it more difficult to implement high conversion gain pixels.

Therefore, a CTIA pixel circuit utilizing a shared reset switch network may be implemented to minimize leakage current and reduce the per-pixel area, as described in further detail below.

Shared Three-Switch Reset Network

Figure 4:
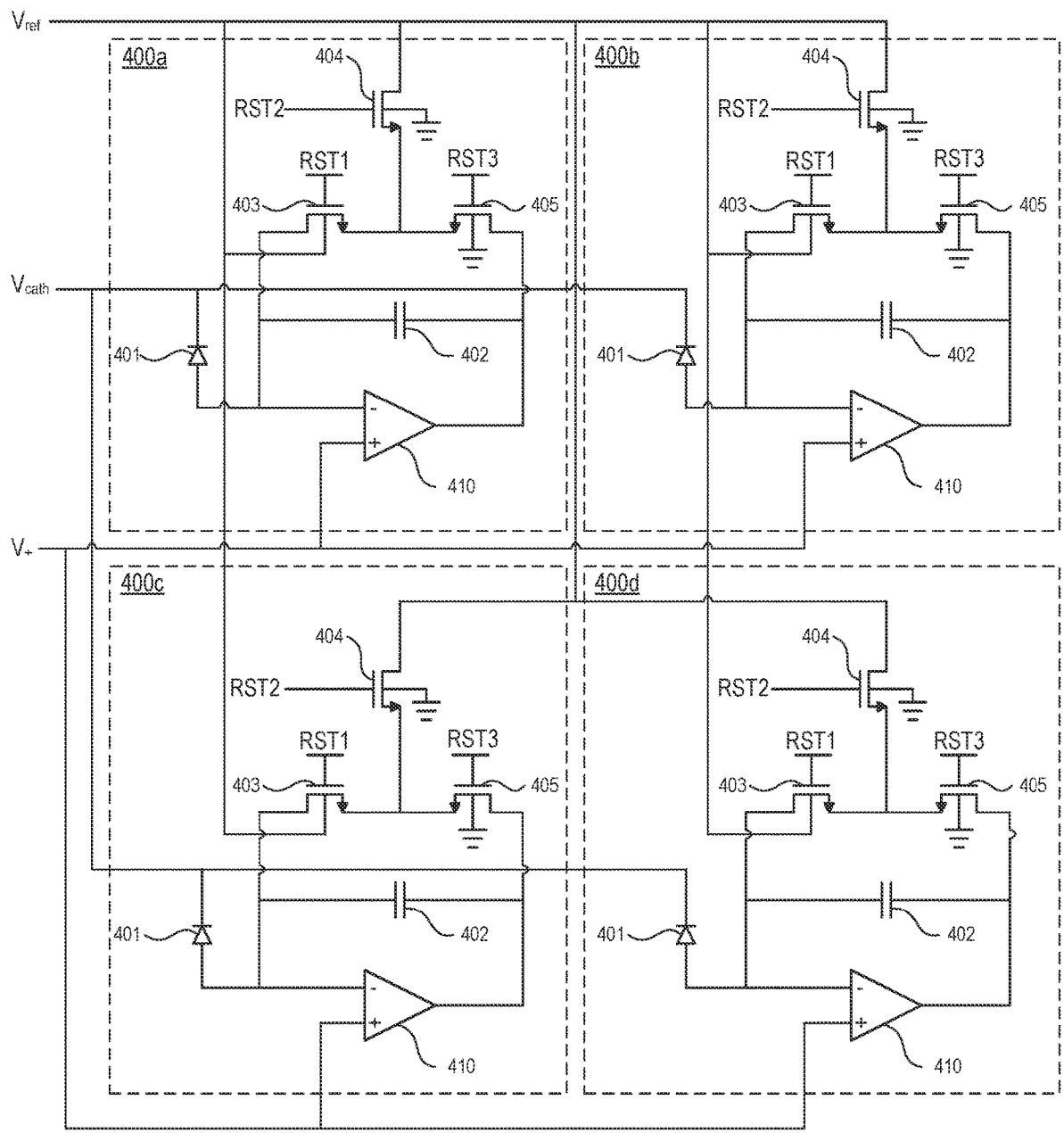
FIG. 4 illustrates another exemplary pixel circuit according to various aspects of the present disclosure.

FIG. 4 illustrates an exemplary pixel circuit having a CTIA architecture and which implements a shared reset switch network. In this particular implementation, each reset switch network used in the exemplary pixel circuit of FIG. 4 is a three-transistor reset switch network similar to that illustrated in FIG. 3. In other aspects, each reset switch network used in the exemplary pixel circuit of FIG. 4 may be a single reset switch similar to that illustrated in FIG. 2.

As illustrated in the particular implementation of FIG. 4, the pixel circuit includes four pixels 400a-d. Each pixel 400a-d includes a photoelectric conversion device 401 (e.g., a photodiode), a feedback capacitor 402, a differential amplifier 410, and a three-transistor reset switch network including a first reset transistor 403, a second reset transistor 404, and a third reset transistor 405. In each pixel 400a-d, the differential amplifier 410 includes an inverting terminal operatively connected to an anode electrode of the photoelectric conversion device 401, and a non-inverting terminal of the differential amplifier 410 receives a common voltage $V_+$. In some aspects, the common voltage $V_+$ may be equivalent to the reference voltage $V_{ref}$. While not illustrated in the particular example of FIG. 4, each pixel 400a-d in the pixel circuit may include one or more additional transistors. Moreover, while FIG. 4 illustrates NMOS transistors, the pixel circuit may be implemented using PMOS transistors or using a combination of NMOS and PMOS transistors. In practice, these conductivity types are not limiting, and various ones of the transistors may be implemented using a different conductivity type than that illustrated in FIG. 4.

Referencing pixel 400a of the pixel circuit, the first reset transistor 403 and the third reset transistor 405 of the three-transistor reset switch network are connected in series across the electrodes of the feedback capacitor 402, such that a source terminal of the first reset transistor 403 is connected to a source terminal of the third reset transistor 405. A source terminal of the second reset transistor 404 is connected to a node between the first reset transistor 403 and the third reset transistor 405. Respective body terminals of the second reset transistor 404 and the third reset transistor 405 are grounded in the illustration of FIG. 4; however, in practical implementations one or both of these transistors may be source-body tied. Each of the transistors in the three-transistor reset switch network operates under the control of a corresponding control signal, such that a gate terminal of the first rest transistor 403 receives a first reset signal RST1, a gate terminal of the second reset transistor 404 receives a second reset signal RST2, and a gate terminal of the third reset transistor 405 receives a third reset signal RST3.

During an integration state of the pixel circuit, the reset signals RST1-RST3 have respective values such that the first reset transistor 403 is in the open state, the second reset transistor 404 is in the closed state, and the third reset transistor 405 is in the open state. In this state, the leakage current is minimized because, ignoring the offset voltage of the differential amplifier 410, the respective voltages on all terminals of the first reset transistor 403 are equal. Minimizing the leakage current allows for a higher conversion gain to be achieved.

During a reset state of the pixel circuit, the reset signals RST1-RST3 have respective values such that the first reset transistor 403 is in the closed state, the second reset transistor 404 is in the open state, and the third reset transistor 405 is in the closed state. This effectively places the circuit in a unity-gain mode. In some implementations, when transitioning from the reset state to the integration state, the first reset transistor 403 may be opened before the second reset transistor 404 closes and the third reset transistor 405 opens. This timing may minimize charge injection.

Compared with the source-body tie in the first reset transistor 303 illustrated in FIG. 3, a body terminal of the first reset transistor 403 in each pixel 400a-d of pixel circuit is connected to a common reference voltage $V_{ref}$. By providing the common reference voltage $V_{ref}$ to the three-transistor reset switch network in each pixel 400a-d of the pixel circuit, a shared reset switch network is created. Operatively connecting the body terminal of the first reset transistor 403 in each pixel 400a-d to the common voltage $V_{ref}$ creates one uniform well voltage for all reset switch networks implemented in pixel circuit. This will be achieved regardless of whether each pixel 400a-400d includes a separate second reset transistor 404 as shown in FIG. 4, or a single second reset transistor 404 is provided for all pixels 400a-400d. This uniform well voltage decreases the overall pixel area of the pixel circuit by removing the unique well voltages created by each reset switch network. In addition, a drain terminal of the second reset transistor 404 in each pixel 400a-d is also connected to the common reference voltage $V_{ref}$. Ideally, the common voltage $V_{ref}$ is equal to the voltage on the source terminal and the drain terminal of the first reset transistor 403 such that the junction leakage currents are eliminated.

While the particular implementation illustrated in FIG. 4 shows the pixels 400b-c in the pixel circuit to include the same three-transistor reset switch network as pixel 400a, different designs of reset switch networks may be implemented across various pixels in the pixel circuit. For example, each pixel 400a-d in the pixel circuit may implement the single reset switch as shown in FIG. 2. In such an implementation, the body terminal of the single reset transistor among several pixels may be connected to a common reference voltage $V_{ref}$ in the manner described above with regard to the first reset transistor 403. The pixel circuit may also implement a combination of single reset switches and three-transistor reset switch networks in the various pixels of the CTIA architecture.

Furthermore, while only four pixels in a two-by-two CTIA pixel network are actually shown in FIG. 4, the pixel circuit may include any number of pixels in an M-by-N pixel network, where M and N are positive integers and at least one of M and N is larger than 1. The common voltage $V_{ref}$ applied to the reset switch network in each pixel creates one uniform well voltage for the M-by-N pixel network, thereby reducing the per-pixel area. The three-transistor reset switch network implemented in each pixel of the pixel circuit minimizes the leakage current, thereby allowing for a higher conversion gain to be achieved.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A pixel circuit, comprising:
    a photoelectric conversion device;
    an amplifier including a first input terminal connected to the photoelectric conversion device, and an output terminal;
    a capacitor disposed between the first input terminal and the output terminal;
    a first reset switch disposed between the first input terminal and the output terminal in parallel with the capacitor, the first reset switch including a body terminal connected to a common reference voltage that is distinct from ground;
    a second reset switch; and
    a third reset switch,
    during a reset state of the pixel circuit, the first reset switch is in a closed state, the second reset switch is in an open state, and the third reset switch is in the closed state, and during an integration state of the pixel circuit, the first reset switch is in the open state, the second reset switch is in the closed state, and the third reset switch is in the open state.

2. The pixel circuit according to claim 1, wherein the photoelectric conversion device receives a charge from an incident light, and the amplifier outputs a signal indicative of the received charge.

3. The pixel circuit according to claim 1, wherein the photoelectric conversion device includes a first electrode connected to the first input terminal and a second electrode connected to a cathode voltage.

4. The pixel circuit according to claim 1, wherein the amplifier includes a second input terminal configured to receive a predetermined terminal voltage.

5. The pixel circuit according to claim 4, wherein the predetermined terminal voltage is equal to the common reference voltage.

6. The pixel circuit according to claim 1, wherein the first reset switch is a transistor.

7. A pixel circuit, comprising:
a plurality of pixels arranged in an array, a first pixel of the plurality of pixels including:
a first photoelectric conversion device;
a first amplifier including a first input terminal connected to the first photoelectric conversion device, and a first output terminal;
a first capacitor disposed between the first input terminal and the first output terminal; and
a first reset switch network disposed between the first input terminal and the first output terminal in parallel with the first capacitor, the first reset switch network including a first reset transistor with a first body terminal connected to a common reference voltage that is distinct from ground, a second reset transistor, and a third reset transistor,
during a reset state of the pixel circuit, the first reset transistor is in a closed state, the second reset transistor is in an open state, and the third reset transistor is in the closed state, and
during an integration state of the pixel circuit, the first reset transistor is in the open state, the second reset transistor is in the closed state, and the third reset transistor is in the open state.

8. The pixel circuit according to claim 7, further comprising a second pixel of the plurality of pixels including:
a second photoelectric conversion device;
a second amplifier including a second input terminal connected to the second photoelectric conversion device, and a second output terminal;
a second capacitor disposed between the second input terminal and the second output terminal; and
a second reset switch network disposed between the second input terminal and the second output terminal in parallel with the second capacitor, the second reset switch network including a fourth reset transistor with a fourth body terminal configured to connect to the common reference voltage, a fifth reset transistor, and a sixth reset transistor.

9. The pixel circuit according to claim 7, wherein
the second reset transistor includes a second body terminal, and the third reset transistor includes a third body terminal; and
the second body terminal and the third body terminal are both connected to the ground.

10. The pixel circuit according to claim 7, wherein
the first reset transistor and the third reset transistor are connected in series between the first input terminal and the first output terminal, and
one of a source terminal or a drain terminal of the second reset transistor is connected to a node between the first reset transistor and the third reset transistor.

11. The pixel circuit according to claim 10, wherein the other of the source terminal or the drain terminal of the second reset transistor is connected to the common reference voltage.

12. The pixel circuit according to claim 7, wherein the first amplifier includes a second input terminal configured to receive a predetermined terminal voltage.

13. The pixel circuit according to claim 12, wherein the predetermined terminal voltage is equal to the common reference voltage.

14. The pixel circuit according to claim 7, wherein the first photoelectric conversion device includes a first electrode connected to the first input terminal and a second electrode connected to a cathode voltage.

15. A pixel circuit, comprising:
a plurality of pixels arranged in an array, a first pixel of the plurality of pixels including:
a first photoelectric conversion device;
a first amplifier including a first input terminal connected to the first photoelectric conversion device, and a first output terminal;
a first capacitor disposed between the first input terminal and the first output terminal; and
a first reset switch network disposed between the first input terminal and the first output terminal in parallel with the first capacitor, the first reset switch network including a first reset transistor with a first body terminal connected to a common reference voltage, a second reset transistor, and a third reset transistor, wherein
during a reset state of the pixel circuit, the first reset transistor is in a closed state, the second reset transistor is in an open state, and the third reset transistor is in the closed state, and
during an integration state of the pixel circuit, the first reset transistor is in the open state, the second reset transistor is in the closed state, and the third reset transistor is in the open state.

16. The pixel circuit according to claim 15, wherein
the first reset transistor receives a first signal that controls whether the first reset transistor is in the closed state or the open state;
the second reset transistor receives a second signal that controls whether the second reset transistor is in the closed state or the open state; and
the third reset transistor receives a third signal that controls whether the third reset transistor is in the closed state or the open state.

17. The pixel circuit according to claim 7, wherein the first photoelectric conversion device receives a charge from an incident light, and the amplifier outputs a signal indicative of the received charge.

18. The pixel circuit according to claim 7, wherein the first reset transistor, the second reset transistor, and the third reset transistor are NMOS transistors.

19. The pixel circuit according to claim 7, wherein the first reset transistor, the second reset transistor, and the third reset transistor are PMOS transistors.

* * * * *